US008096745B2

(12) United States Patent
Lamothe

(10) Patent No.: US 8,096,745 B2
(45) Date of Patent: Jan. 17, 2012

(54) PAPER ROLL TRANSPORT CART

(75) Inventor: Richard P. Lamothe, Burlington, CT (US)

(73) Assignee: Energy Saving Products & Sales Corp., Burlington, CT (US)

( * ) Notice: Subject to any disclaimer, the term of this patent is extended or adjusted under 35 U.S.C. 154(b) by 413 days.

(21) Appl. No.: 11/965,067

(22) Filed: Dec. 27, 2007

(65) Prior Publication Data

US 2009/0169350 A1 Jul. 2, 2009

(51) Int. Cl.
*B62B 3/065* (2006.01)
*B66F 9/065* (2006.01)

(52) U.S. Cl. ....... 414/428; 414/911; 280/79.6; 180/19.3

(58) Field of Classification Search ................. 180/19.2, 180/19.3; 414/911, 428; 280/79.4, 79.6
See application file for complete search history.

(56) References Cited

U.S. PATENT DOCUMENTS 2,327,583 A * 8/1943 Framhein ..................... 180/19.2
2,399,605 A * 4/1946 Schroeder .................... 180/65.1
2,645,297 A * 7/1953 Wennberg et al. ........... 180/65.1
2,902,105 A * 9/1959 Wiley et al. .................. 180/274
3,249,170 A * 5/1966 Quayle ........................ 180/19.2
3,791,474 A * 2/1974 Stammen et al. ............. 180/332
4,084,763 A * 4/1978 Zamboni ....................... 414/911
4,373,854 A * 2/1983 Schultheis .................... 414/742
4,460,135 A * 7/1984 Hirakawa et al. ............. 414/911
4,575,303 A * 3/1986 Lindell ......................... 414/430
4,740,131 A * 4/1988 Mayle ........................... 414/460
4,934,413 A * 6/1990 Yao .............................. 414/911
4,973,206 A * 11/1990 Engle ............................ 410/67
5,052,877 A * 10/1991 Jaaskelainen et al. ........ 414/458
5,090,630 A * 2/1992 Kopecky et al. .............. 414/911
5,125,468 A * 6/1992 Coker ............................ 180/13
5,253,972 A 10/1993 Drew et al.
5,524,415 A * 6/1996 Pachinger et al. .............. 53/203
5,544,719 A 8/1996 Boriani et al.
5,573,078 A * 11/1996 Stringer et al. .............. 180/19.2
5,743,703 A * 4/1998 Nakajima ..................... 414/590
5,860,485 A * 1/1999 Ebbenga ...................... 180/19.2
5,895,197 A * 4/1999 McVaugh ..................... 414/911
6,343,674 B1 * 2/2002 Sexsmith ...................... 187/222
6,343,907 B1 * 2/2002 Schalmath .................... 414/495
6,390,759 B1 5/2002 Novak et al.
6,880,652 B2 * 4/2005 Holtan et al. ................ 180/19.2
7,025,157 B2 * 4/2006 Lindsay et al. .............. 180/19.2
7,040,427 B2 * 5/2006 Toomey ....................... 180/19.2
7,314,116 B2 * 1/2008 David et al. ................... 187/231

FOREIGN PATENT DOCUMENTS

DE 3130328 A1 * 2/1983 .................... 414/911

* cited by examiner

*Primary Examiner* — James Keenan
(74) *Attorney, Agent, or Firm* — McCormick, Paulding & Huber, LLP

(57) ABSTRACT

A three wheeled cart for transporting heavy rolls of paper to and from unwinders and reminders. The operator stands at the rear end where he can start and stop the cart, steer it, and control the carriage at the front end for lifting the paper roll from the floor and/or into a processing machine. The steerable rear wheel is driven electrically from a twist type throttle on a steering handle that can be moved from an active position to a stowed position. In the stowed position the cart is secured by the same motor-brake that drives the single rear wheel.

2 Claims, 3 Drawing Sheets

PAPER ROLL TRANSPORT CART

BACKGROUND OF THE INVENTION

This invention relates generally to motorized carts for the transport of paper rolls in a print shop of the type having paper roll unwinders and roll reminders located at the input and output end of a printer. The transport cart of the present invention is particularly designed and configured for the transport of relatively heavy (one thousand pounds and up) paper rolls of the type commonly used with laser printers.

While motorized carts are now available for this purpose, the present invention provides a unique cart that is not only capable of picking up the roll and transporting the roll in a motorized fashion, but wherein the cart is provided at it's aft or rear end with a motorized driven wheel that can be conveniently steered with a hand held yoke having a speed control similar to that provided on a motorcycle. The yoke is manually steerable from the upper, or handle end. The yoke is also moveable fore and aft, such that the cart can be conveniently stopped by a self operating braking system in response to movement of the handle from its active operating position, to a forward or stowed position to set the braking system.

The cart includes a load lifting carriage in the form of a pair of pivotably mounted roll support arms that allow the operator to raise or lower a paper roll from and to position in a roll unwind or rewind machine of the type manufactured by the Assignee of the present application, Energy Saving Products, Inc. of Burlington, Conn., USA.

In the cart of the present invention, the above described yoke includes a lower portion which supports a single motorized drive wheel on a vertical axis (the steering axis) and wherein the drive motor and braking means are provided in the lower portion of the yoke. The drive means comprise an electric motor which is DC driven so as to serve as a brake for the single steerable drive wheel. Rechargable electric batteries are provided on either side of the drive wheel for better balance of the three wheel cart, and to improve traction for the single drive wheel.

The motorized load lifting carriage is operated by a hydraulic system, including at least one hydraulic motor coupled between the carriage and the machine frame. Electric circuitry, including a pump motor for generating hydraulic pressure, is provided in the transport unit, also includes means for controlling both the drive motor and the brake associated with the single steerable rear wheel.

DETAILED DESCRIPTION

The drawings show the cart of the present invention as having a U-shaped frame 12 with forwardly projecting leg portions 12*a* and 12*b*. The paper roll R may be raised upwardly off the floor F by a U-shaped carriage 10 having parallel arms 10*a* and 10*b* joined at a pivoted end of the carriage by a cross member 10*c*. These carriage arms 10*a* and 10*b* are arranged parallel to the leg portions 12*a* and 12*b* of the frame 12.

Each of the U-shaped carriage arm portions, 10*a* and 10*b*, has a hydraulic actuator, 14*a* and 14*b*, provided between it and the frame 12. As so constructed and arranged the U-shaped lifting carriage arms 10*a* and 10*b* raise and lower the paper roll R from the position shown for it in FIG. 3 to that of FIG. 1.

Figure 2:
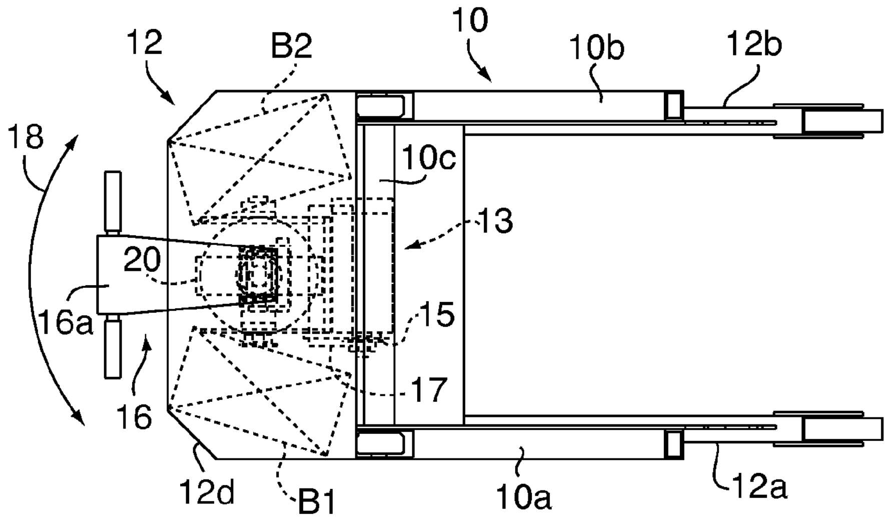
FIG. 2 is a top plan view of the cart illustrated in FIG. 1.
Figure 3:
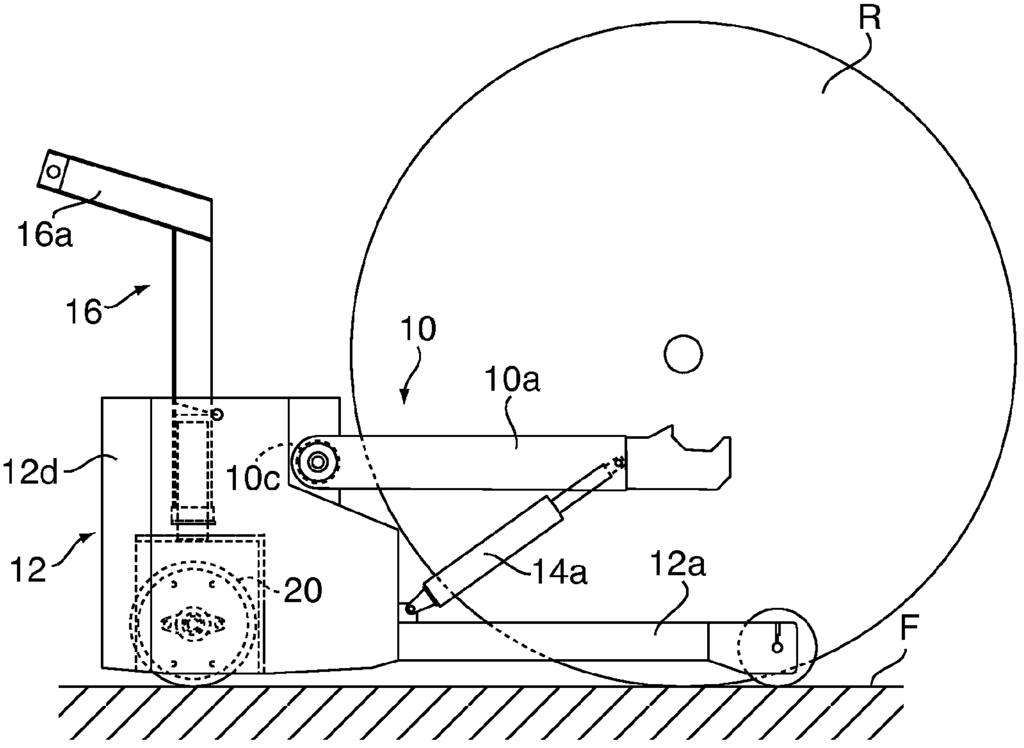
FIG. 3 is a view similar to FIG. 1 but illustrating a paper roll resting on the floor, prior to being picked up by the lifting arms of the carriage.
Figure 4:
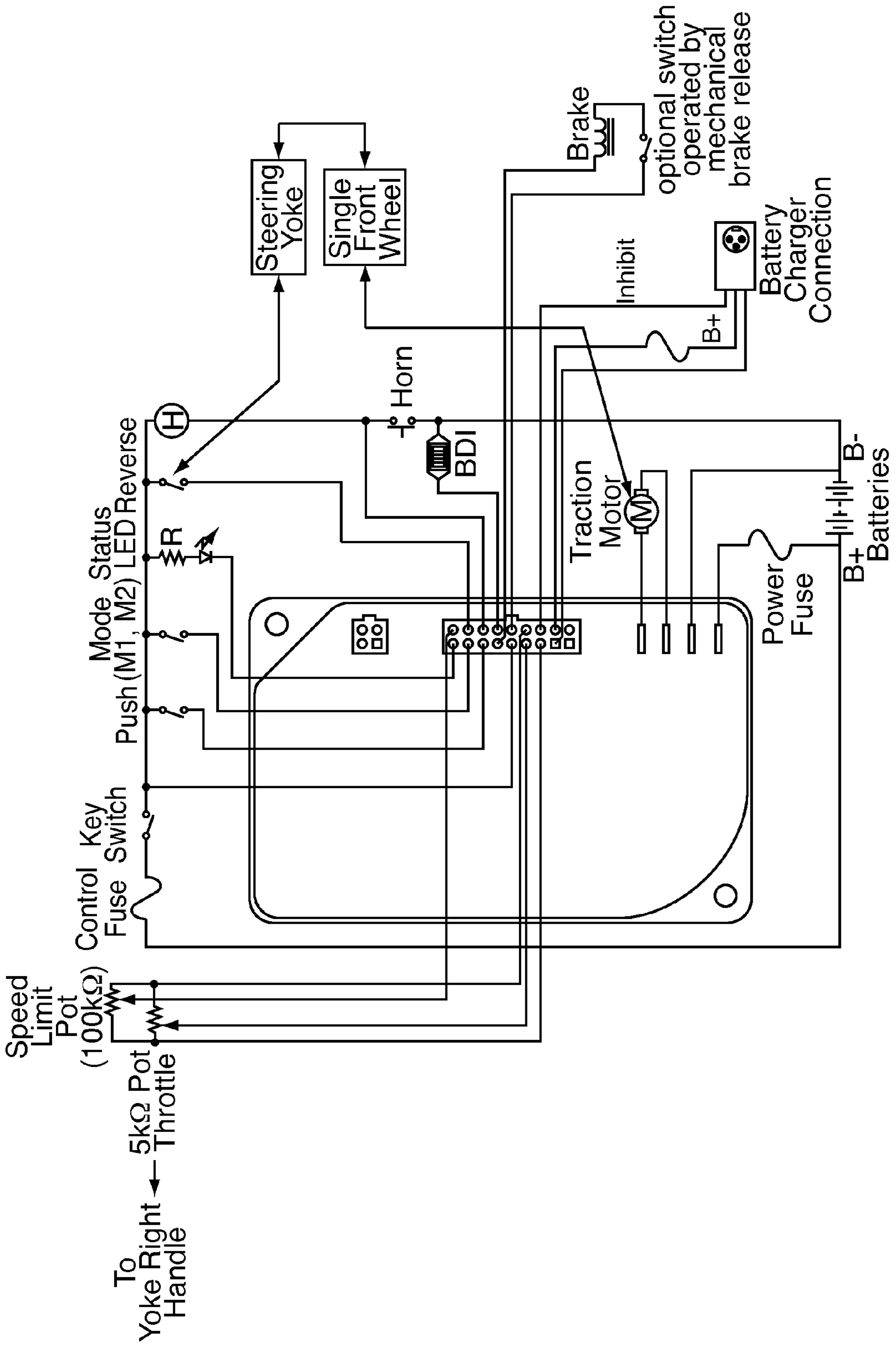
FIG. 4 is a schematic view illustrating the electric circuitry for the drive motor and associated drive wheel brake, and the associated speed control circuitry for the electric drive motor.

The transport cart is operated from the rear driven end, as best shown in FIG. 3 where the operator can conveniently reach the upper handle end portion 16*a* of the yoke 16. Fore and aft movement of the upper portion 16*a* of the yoke, as suggested in FIG. 1, operates the brake. Rotation of the yoke 16, left to right in the direction of the arrow 18 in FIG. 2, steers the single motorized drive wheel 20 provided at the lower or fork end of the yoke 16. The yoke 16 is rotatably supported in the frame 12 for this purpose.

The frame 12 further comprises a forward portion 12*d* that defines an enclosure for the electric batteries B1 and B2 that are provided one on either side of the steering axis. The yoke lower portion has a fork that carries the motorized or driven wheel 20 referred to previously.

Aft of the battery compartment, described in the preceeding paragraph, and as seen in FIG. 2, is an enclosed compartment or chamber of the frame 12 provided to house the hydraulic system components 13 for raising and lowering the U-shaped carriage 10 described previously. The hydraulic system 13 comprises an electric motor 15 coupled to a hydraulic pump 17 that provides hydraulic pressure to the hydraulic actuators 14*a* and 14*b*. These actuators are controlled by conventional valves from electric switches located conveniently on a control panel within reach of the cart operator, for operation of solenoid valves in the hydraulic systems.

The upper handle portion of the yoke is provided with a throttle grip, twist style speed control on at least one side of the handle, preferably the right hand side, with a rheostat type electric speed control providing input to the electrical circuitry for operating the drive motor associated with the single driven wheel 20. The steerable handle and yoke arrangement provides the operator with ease of operation in the forward and aft direction as well as in the left and right hand turning directions.

Figure 1:
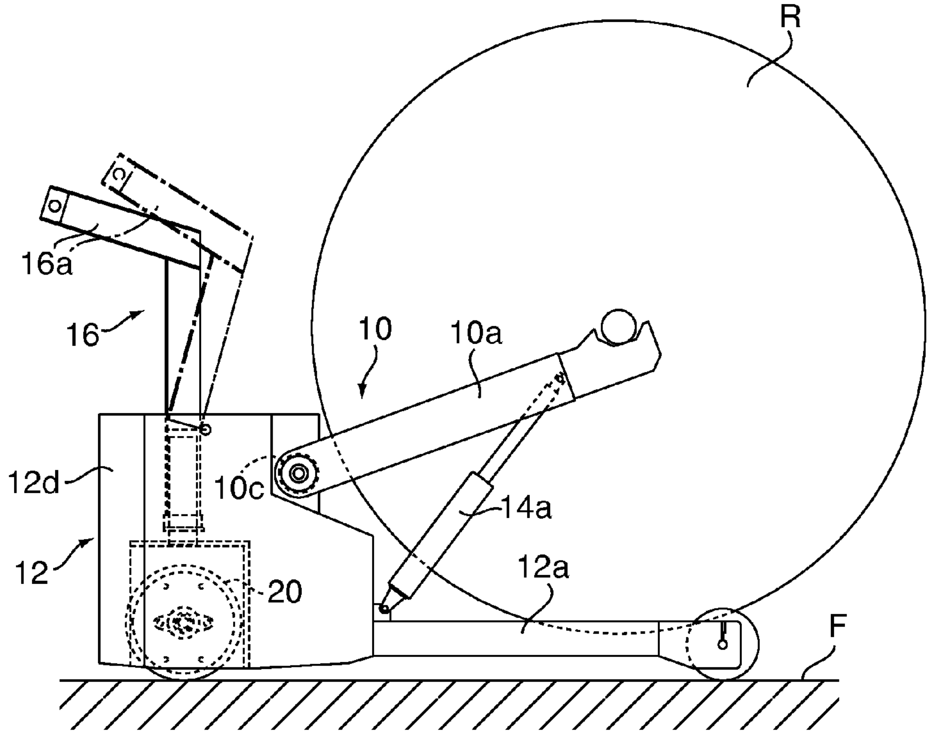
FIG. 1 is a right side elevational view illustrating the components of a hand cart constructed in accordance with the present invention, and illustrating the paper roll in a raised condition for transport of the roll, and also illustrating the yoke and upper handle portion of the yoke in both a forward, or braking position of the cart and an aft operating position.
Figure 1A:
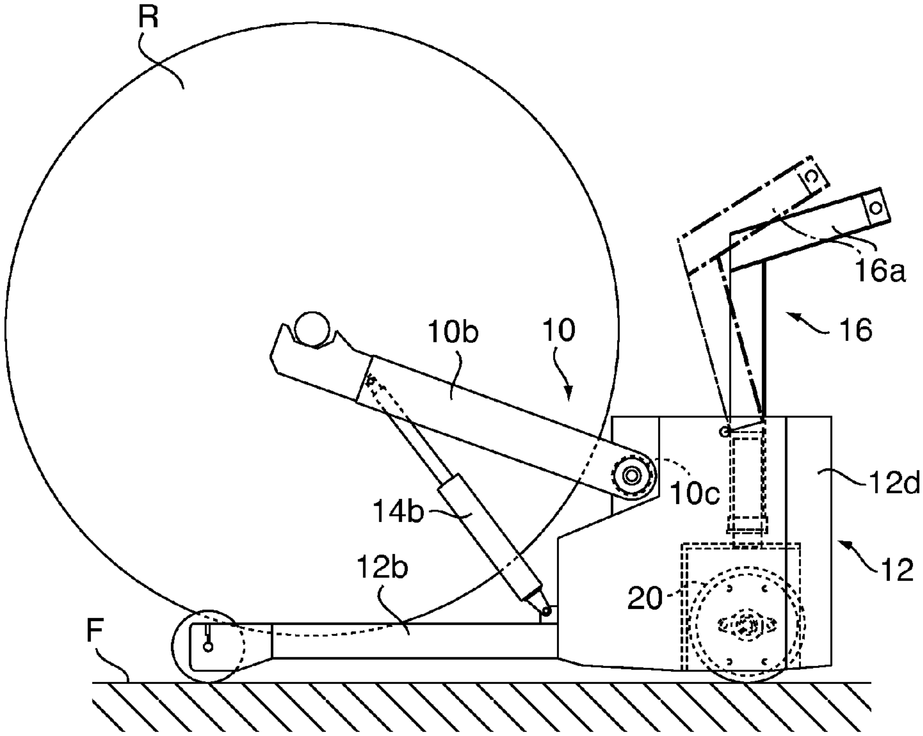
FIG. 1A is a left side elevational view illustrating the components of a hand cart constructed in accordance with the present invention, and illustrating the paper roll in a raised condition for transport of the roll, and also illustrating the yoke and upper handle portion of the yoke in both a forward, or braking position of the cart and an aft operating position.

Braking of the transport unit is achieved by movement of the upper handle portion between a normal operating, or aft position as illustrated in FIG. 1, to the stored, or forward position of the handle as also shown in FIG. 1. Limit switches are provided in the frame 12 for control of the DC electric motor, associated with the driven wheel 20. The circuiting allows operation of the motor as a motorized brake.

The electrical circuitry associated with driving the motor, operating the motor as a brake, and controlling the speed of the drive motor, are preferably of the form shown in the operating manual provided by the manufacturer Curtis Instruments of Mt. Kisco, N.Y. sold under the trade name Motor Speed Controller model no. 1210, and currently used in electrified wheelchairs or similar devices.

In light of the above, it is therefore understood that within the scope of the appended claims, the invention may be practiced otherwise than as specifically described.

What is claimed is:

1. A paper roll transport cart for picking up and transporting paper rolls, said transport cart comprising:

a frame having a body portion with leg portions projecting forwardly from said body portion, each of said leg portions having a front wheel rotatably supported at a forward end thereof, and a yoke moveably supported in said body portion for steering movement of the transport cart, said yoke including a lower portion rotatably supported on a vertical steering axis defined by said body portion, and an electric motor, a single electrically driven rear wheel in said lower portion of said yoke and coupled to said electric motor, said yoke having an upper portion for manipulating said yoke to steer said single rear wheel from an aft end of said body portion, said yoke upper portion having a handle, and a speed control incorporated in said handle for adjusting the rotational speed of said electric motor for said driven rear wheel, a roll lifting carriage moveably mounted in said frame for lifting a paper roll provided generally between said frame leg portions, said carriage having a pair of roll support arms pivotally mounted in said frame body portion and joined at a pivoted end thereof by a cross member, and a pair of hydraulic actuators attached to said frame and extending at a forward angle to, and attached to, a distal portion of said roll support arms for pivoting upwardly said support arms to lift the paper roll upwardly, two rechargeable electrical batteries are provided in said frame above and to the sides of said motorized driven wheel, for lending the weight of said batteries to the driven wheel for increased traction, and a hydraulic system, said hydraulic actuators being operated by said hydraulic system which system includes at least one hydraulic pump and a hydraulic motor for pressurizing said hydraulic system, said hydraulic motor being driven by electrical power from said rechargeable electrical batteries.

2. The transport cart of claim 1 wherein said yoke upper portion and said handle being moveable vertically between an active and a stowed position, and electromagnetic braking means associated with said electric motor for preventing said motorized rear wheel from rotating when said yoke upper portion is moved from said active position-into said stowed position.

* * * * *

UNITED STATES PATENT AND TRADEMARK OFFICE

CERTIFICATE OF CORRECTION

PATENT NO. : 8,096,745 B2
APPLICATION NO. : 11/965067
DATED : January 17, 2012
INVENTOR(S) : Richard P. Lamothe It is certified that error appears in the above-identified patent and that said Letters Patent is hereby corrected as shown below:

On the Title Page:

In the Abstract:

Line 2, please delete “reminders” and insert --rewinders--.

Signed and Sealed this
Twentieth Day of March, 2012

David J. Kappos
*Director of the United States Patent and Trademark Office*